United States Patent [19]

Maram et al.

[11] Patent Number: 4,767,911
[45] Date of Patent: Aug. 30, 1988

[54] OPTICAL WELD CONTOUR MONITOR FOR PENETRATION CONTROL

[75] Inventors: Jonathan M. Maram, Tarzana; Matthew A. Smith, Canoga Park, both of Calif.

[73] Assignee: Rockwell International Corporation, El Segundo, Calif.

[21] Appl. No.: 19,269

[22] Filed: Feb. 26, 1987

[51] Int. Cl.$^4$ ............................................. B23K 9/10
[52] U.S. Cl. ........................... 219/130.01; 219/130.21; 219/137 PS
[58] Field of Search ...................... 219/130.01, 130.21, 219/124.34, 137 PS

[56] References Cited

U.S. PATENT DOCUMENTS

| | | | |
|---|---|---|---|
| 3,526,748 | 9/1970 | Rienks | 219/131 |
| 4,093,844 | 6/1978 | Erwin et al. | 219/124.02 |
| 4,348,578 | 9/1982 | Masaki | 219/130.01 |
| 4,450,339 | 5/1984 | Corby, Jr. | 219/124.34 |
| 4,488,032 | 12/1984 | Case, Jr. et al. | 219/124.34 |
| 4,491,719 | 1/1985 | Corby, Jr. | 219/124.34 |
| 4,493,968 | 1/1985 | Brown | 219/124.34 |
| 4,521,670 | 6/1985 | Case, Jr. | 219/130.01 |
| 4,532,408 | 7/1985 | Richardson | 219/130.01 |
| 4,535,215 | 8/1985 | Kliesch | 219/61.5 |
| 4,567,347 | 1/1986 | Ito et al. | 219/124.34 |
| 4,578,554 | 3/1986 | Coulter | 219/121 |

OTHER PUBLICATIONS

R. J. Renwick and R. W. Richardson, "Experimental Investigation of GTA Weld Pool Oscillations", Welding Research Supplement to the Welding Journal, Feb. 1983, pp. 29s–35s.

D. C. Buffum, "Automatic Control of Weld Penetration", Army Materials and Mechanics Research Center Final Report No. AMMRC-TR-78-6, Feb. 1978.

M. A. Khan, N. H. Madsen and B. A. Chin, "Infrared Thermography as a Control for the Welding Process", SPIE 1983, vol. 446, pp. 154–165.

*Primary Examiner*—Clifford C. Shaw
*Attorney, Agent, or Firm*—H. Fredrick Hamann; Harry B. Field; Lawrence N. Ginsberg

[57] ABSTRACT

A method and apparatus for real-time determination of weld quality. A collimated light source 10 directs a beam 16 of collimated light to a point on the weld pool surface 24. A position sensor 34 measures the direction of the light after it is specularly reflected from the weld pool surface 24. Electronic means 36, 38, 40 analyze this measurement for determining changes in angles of the weld pool surface 24 for real-time indication of the state of penetration of the weld pool 26.

31 Claims, 3 Drawing Sheets

OPTICAL WELD CONTOUR MONITOR FOR PENETRATION CONTROL

STATEMENT OF GOVERNMENT INTEREST

The invention described herein was made in the performance of work under Contract No. NAS8-27980 and is subject to the provisions of Section 305 of the National Aeronautics and Space Act of 1958 (72 Stat. 435; 42 USC 2457).

BACKGROUND OF THE INVENTION

1. Field of the Invention

This invention relates to an apparatus and method for determining the state of penetration of the weld pool and more particularly to an apparatus and method utilizing a photo-position detector to monitor the angular position of a beam of light specularly reflected from the weld pool to determine the state of penetration.

2. Description of the Prior Art

Several techniques have been disclosed for determining the state of penetration of a weld pool. One technique disclosed in "Automatic Control of Weld Penetration" by D. C. Buffum, Army Materials & Mechanics Research Center Final Report No. AMMRC-TR-78-6, Feb. 1978, involves placing a sensor (optical, infrared, etc.) on the root side of the weld joint to detect whether or not full penetration has been achieved. The major problem with this technique is that it requires accessibility to the root side of the joint. Adequate accessibility is not available on the hardware to be welded.

Another technique that has been applied to weld process monitoring is infrared thermography of the weld pool ("Infrared Thermography as a Control for the Welding Process" by M. A. Kahn, N. H. Madsen and B. A. Chin, SPIE, Vol, 446, pp. 154–165, SPIE 1983). In this procedure, the isotherms in and around the weld pool are monitored by infrared detectors. If sufficient experimental work is done, the isotherm distribution observed at the arc surface of the weld can be correlated with level of penetration. However, several aspects of this approach are unfavorable. First, very slight variations in the heat sink properites of the hardware being welded can significantly alter the isotherm pattern. Second, accurate calibration of the system requires a knowledge of the emissivity of the material's surface. This property will vary with surface finish, thermal history and surface cleanliness. Finally, determination of penetration by this technique requires a reliable model of the temperature profile of the weld pool. These profiles can vary greatly with only minute differences in alloy composition.

Another scheme for penetration monitoring depends on the principal that arc voltage is a function of arc length. In work disclosed in "Experimental Investigation of GTA Weld Pool Oscillations" by R. J. Renwich and R. W. Richardson, *Welding Research*, Supplement to the Welding Journal, pp. 29-S - 35-S., Feb. 1983, the welding arc current was transiently pulsed from the normal value to a higher value. This current change caused a sudden change in the magnetic constrictive force on the arc and, consequently, a change in the velocity of gas in the arc. As a result, there was a sudden pressure impulse on the weld pool surface as gas velocity changed. This pressure impulse initiated a resonant oscillation of the weld pool surface. As the surface oscillated, the distance between it and the electrode tip, i.e. the arc length, varied and was detected as a change in arc voltage. Therefore, monitoring arc voltage permitted observation of the weld pool natural frequency. (The natural frequency is a function of the weld pool's dimensions, surface tension and mass.) The experimental results showed a resonably good correlation between frequency and the inverse of the square root of weld pool mass. The method disclosed by Renwick and Richardson allows a reasonable measurement of puddle mass and furthermore puddle width can be determined optically. However, the method requires a model that relates puddle mass, puddle width, and puddle depth and no such reliable model exists. Therefore, the method provides only an indirect, inferential and uncertain means of measuring weld penetration.

U.S. Pat. No. 4,491,719 entitled, "Light Pattern Projector Especially for Welding" issued to N. R. Corby, Jr. utilizes a light pattern which is projected onto the surface of a weld pool. An image of the pattern is impressed on the image of the pool due to diffuse scattering at the pool surface. A camera is focused on the weld pool yielding information on weld pool topography from which weld quality can be inferred. The system relies on the fact that the projected pattern will appear on the image on the pool surface and thus relies on the non-specular quality of the pool surface. However, in many welding processes a highly specular weld pool can be expected.

OBJECTS AND SUMMARY OF THE INVENTION

The general object of this invention is to efficiently determine when a weld pool penetrates solid metal during the welding process.

More specifically, it is an object of this invention to provide an apparatus and method to determine weld pool penetration which utilizes the specular qualities of a molten weld pool.

Another object of this invention is to rapidly and accurately determine the penetration state of a weld in real time for automated control of the welding process.

Other objects, advantages and novel features of the present invention will become apparent from the following detailed description of the invention when considered in conjunction with the accompanying drawing.

In its broadest aspects, the present invention comprises means for generating and directing light incident to at least one point on a weld pool surface; means for measuring the direction of the incident light after it is specularly reflected from the weld pool surface; and, electronic means for analyzing said measurement for determining changes in angles of the weld pool surface for real time indication of the state of penetration of the weld pool.

In the preferred embodiment, a laser and optical fiber are used to generate and direct light to a spot near the center of a weld pool. A photo-position detector measures either a sudden sagging in the weld pool or a sudden change in the amplitude of periodic deformations of the weld pool surface due to pulsing of the welding arc.

Utilization of the specular qualities of the molten weld pool allows easy and efficient optical monitoring of the weld pool providing for real-time measurement and control of weld penetration without a need for complicated analytical techniques involved with prior art weld penetration monitoring methods.

BRIEF DESCRIPTION OF THE DRAWINGS

In FIG. 2a the weld pool has not yet completely penetrated the solid metal. In FIG. 2b solid metal has been completely penetrated.

In FIG. 3a, which represents the weld pool prior to penetration, the weld pool is shown to deform only a small amount. As shown in FIG. 3b, once penetration is complete the amplitude of the deformation is greatly increased.

The same elements or parts throughout the figures of the drawings are designated by the same reference characters, while equivalent elements bear a prime designation.

DETAILED DESCRIPTION OF THE INVENTION

Figure 1:
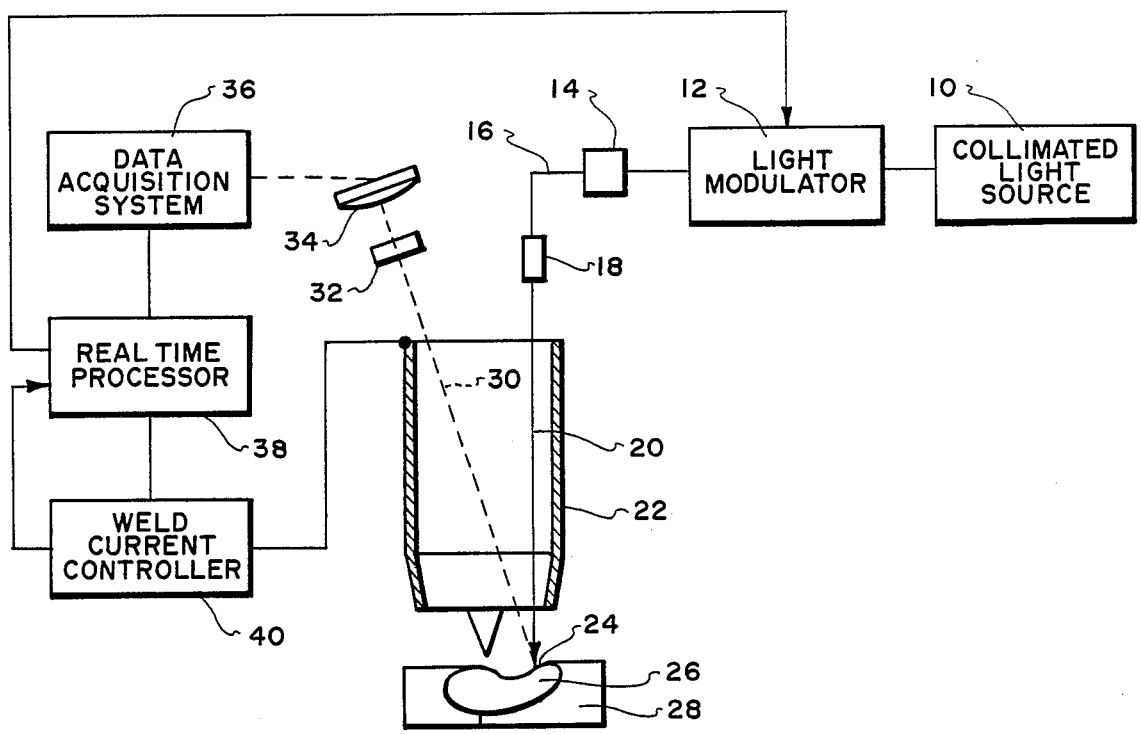
FIG. 1 is a schematic diagram of the system arrangement of the present invention.

Referring to FIG. 1 of the drawings, a light source 10, preferably a laser, is modulated using modulation means 12 such as an acousto-optic modulator or a mechanical chopper. An optical fiber coupler 14 is utilized to couple the light from laser 10 for example, a helium-neon laser, into an optical fiber 16. A focusing lens 18 or other beam narrowing means such as an optical fiber collimator is located at the end of the optical fiber 16. The focusing lens 18 directs a light beam 20 through the welding torch 22 and to the surface 24 of a weld pool 26 formed on a workpiece 28. The light beam 20 should preferably be directed close to the center of the weld pool 26. The reflected light beam 30 from the weld pool surface 24 is filtered by an optical band pass filter 32 such as an interference filter. Light beam 30 is then directed to a photo-position detector 34 such as a CCD array or a solid state detector. A smooth, clean and highly reflective surface is required on the molten weld pool 26. Therefore, the light beam 30 will be specularly reflected therefrom. In this regard a preferred welding process is gas tungsten arc welding which provides a weld pool with the necessary specular quality.

The photo-position detector 34 is connected to either a digital or analog high speed data acquisition system 36 which distinguishes the modulated laser light from any high intensity light from the arc which manages to pass through the optical band pass filter 32. The high speed data acquisition system 36 determines the position of the laser light on the detector 34. A real time processor 38 is used to correlate to laser beam spot position to the state of penetration of the weld. The output of the real time processor 38 is used by a weld current controller 40 to control the current delivered to the welding torch.

There are different ways of interpreting the output of the photo-position detector 34 in order to determine the state of penetration of the weld pool 26. One method is based on the recognition that the weld pool 26 will sag or slump slightly when penetrating through the solid metal due to the absence of solid metal beneath the pool. This causes a change in the angle of the weld pool surface 24 with respect to the incident laser beam 20. The reflected beam 30 therefore changes correspondingly in directin and strikes the photo-position detector 34 at a different point. This phenomenon is illustrated in FIGS. 2a and 2b.

Figure 2A:
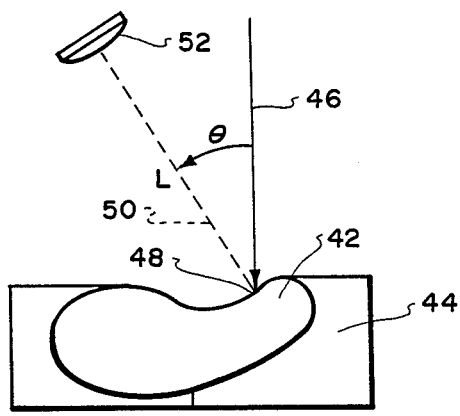
FIGS. 2a and 2b illustrate the way in which a weld pool sags when it completely penetrates solid metal.

FIG. 2a illustrates a weld pool 42' which has not completely penetrated the solid metal workpiece 44. The incident laser beam 46 is reflected off of surface 48 at an angle $\theta$. The reflected beam 50 is directed toward a photo-position detector 52.

Figure 2B:
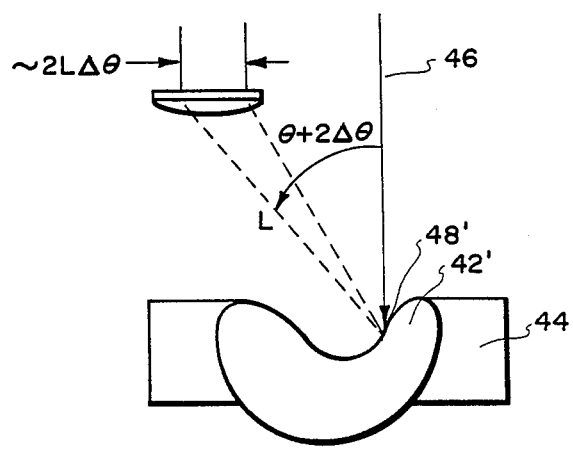

In FIG. 2b the weld pool 42' has penetrated the solid metal workpiece 44. Upon penetration, the weld pool 42' sags and the angle that the weld pool surface 48' makes with the incident beam 46 will change by the amount $\Delta\theta$. Thus, by Snell's law, the reflected beam angle will change by an about $2\Delta\theta$. The photo-position detector will register a displacement given approximately by $2L\Delta\theta$, where L is the length of the reflected beam. (This is accurate for small angular displacements.)

Figure 3A:
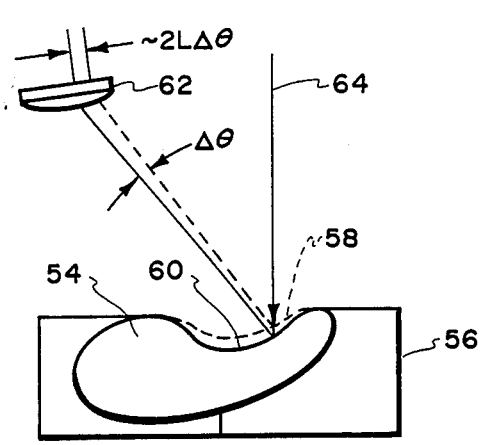
FIGS. 3a and 3b illustrate the way in which a weld pool moves due to arc pressure during pulsed arc welding.

In another method for determining weld penetration, advantage is taken of the response of the weld pool to arch pressure during pulsed arc welding. As a welding arc pulses from lower to high current, the weld pool is further deformed due to increased arc pressure. The amplitude of the deformation will be larger when the weld pool is fully penetrated due to the fact that there is no solid material beneath the pool to inhibit its motion. Reference to this phenomenon is illustrated is FIGS. 3a and 3b. FIG. 3a shows a weld poll 54 which has not completely penetrated solid metal 56. The surface of the weld pool at a low current is denoted by the dashed line 58 while the surface at a high current is denoted by the solid line 60.

Figure 3B:
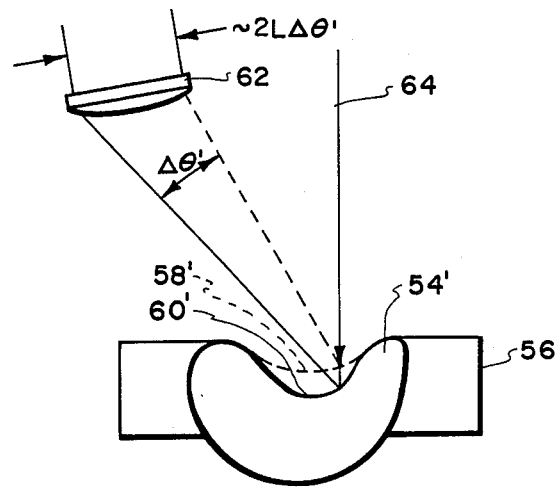

The photo-position detector 62 displacement is approximately equal to $2L\Delta\theta$, where $\Delta\theta$ is the angular displacement of the weld surface with respect to the incident beam 64 as the arc goes from low to high current. In FIG. 3b, the weld pool 54' has fully penetrated the solid metal 56. The angular deflection of the weld pool surface with respect to the incident beam 64 becomes $2L\Delta\theta'$ where $\Delta\theta'$ is the angular displacement of the weld surface with respect to the incident beam 64 as the arc goes from low to high current. This method can be used in constant current welding using a pulsed laser or other means to periodically deform the weld pool surface.

An inherent difficulty in using optical methods for determining weld penetration is that the intense light and electromagnetic interference from the welding arc can interfere with the optical and electronic signals. Utilization of a laser prevents such interferences. A laser provides monochromatic light which can be distinguished from other wavelengths using the optical band pass filter 32. Furthermore, the laser light can be modulated in intensity at a known frequency to distinguish the laser light from interfering light by means of phase sensitive detection. Use of the optical fiber 16 allows the light source 10 to be remotely situated from the hostile environment near the welder 22. The light emerging from the optical fiber 16 must be collimated or focused so that the light beam will subtend only a small spot on the weld pool surface and on the photo-position detector.

EXAMPLES

Figure 4:
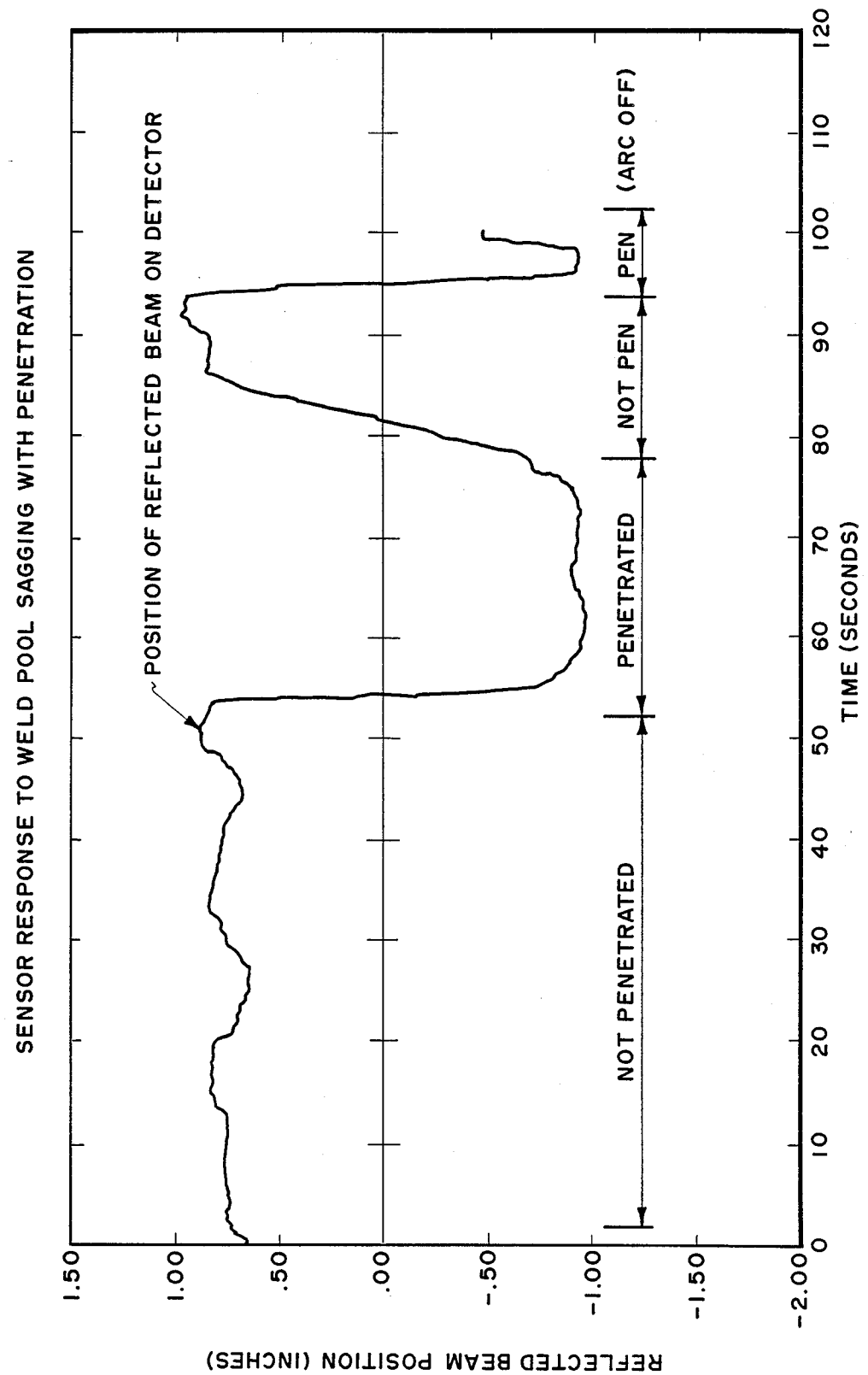
FIG. 4 is a graph of Reflected beam position vs. Time, which illustrates the position sensor's response to weld pool sagging during weld pool penetration.

State of penetration can be determined by, for example, comparing the displacment of the deflected laser beam to an empirically determined threshold. When the weld pool sags due to penetration, the processed output of the photo-position detector will cross the threshole, thus providing an indication that penetration has occurred. FIG. 4 is an illustrative example of the data resulting from such a technique. The data were constructed from a GTA butt weld on $\frac{1}{8}$" thick Inconel 718 coupons. The arc current was alternately raised to 95 amperes and lowered to 70 amperes to generate regions of penetration and lack of penetration. A helium neon laser beam was directed at a point on the weld pool immediately behind a tungsten electrode. After reflection off the weld pool, the beam position was monitored with a solid state light position sensor. As noted in FIG. 4, the reflected beam position on the sensor changed from $+0.75$ inches to $-0.75$ inches at time $=55$ seconds as the weld pool sagged due to full penetration through the metal. A signal of 0 inches on the sensor therefore provides a reliable threshold indication of penetration. Reflected laser beam positions below this threshold correspond to full penetration, and positions above this value correspond to lack of penetration. In FIG. 4 another penetration of the weld pool through the metal took place a time$=95$ seconds. In this example, the welding arc was not pulsed. To determine sagging and distinguish it from transient deformation-inducing effects such as arc pulsing or the introduction of welding wire, the measurement can be averaged over time.

Figure 5:
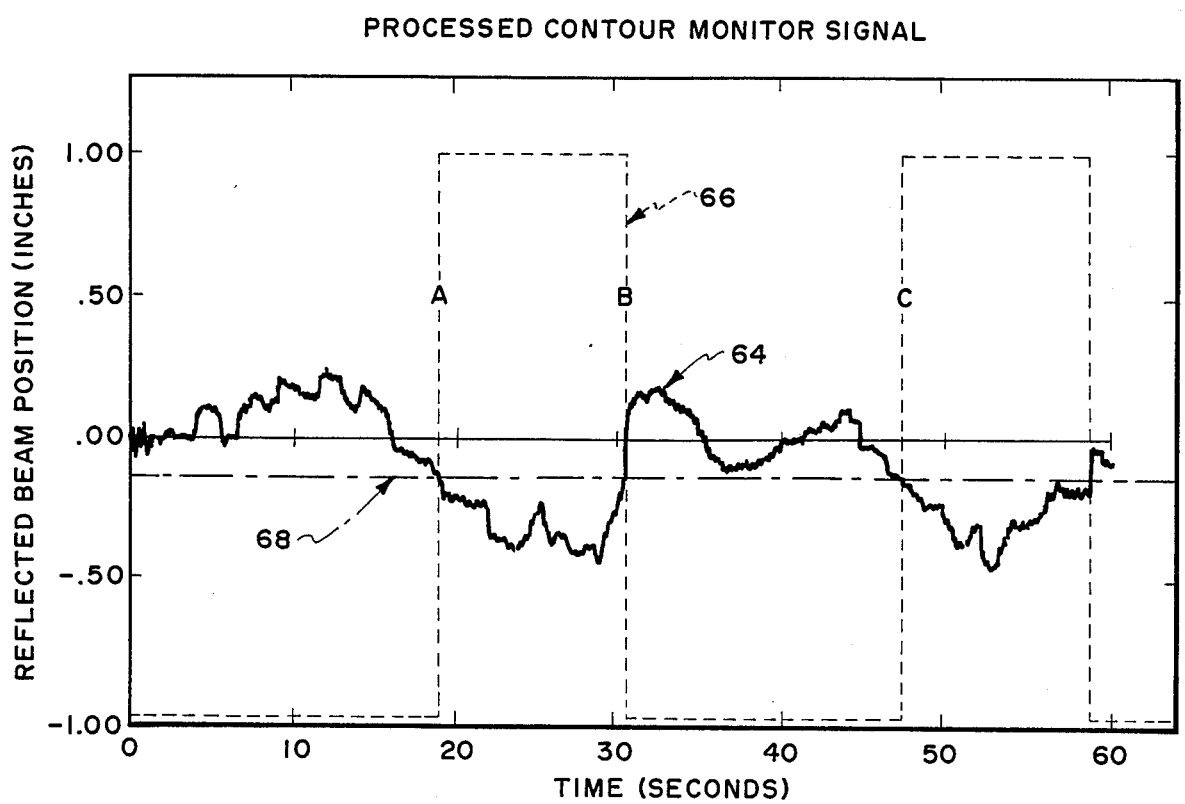
FIG. 5 provides an illustrative example of the processed output of the photo-position detector during pulsed arc welding.

In another example which utilizes the effects of arc pressure during pulsed arc welding, the difference in angular positions of the reflected beam as the arc goes from high to low current can be measured and compared to an empirically determined threshold. When the difference goes beyond this threshold the occurrence of penetration can be noted. FIG. 5 is an example of the processed output of the photo-position detector during pulsed arc welding. The weld in this example was on a 1/16 inch Inconel 718 butt seam with an arc pulse frequency of 2 Hz, a duty cycle of 50%, a high current of 60 amps and a background current of 20 amps. The solid curve designated 64 illustrates the processed laser position signal. The dashed curve 66 is the penetration control signal which goes to a level of $+1$ when the weld is penetrated and $-1$ when the weld is unpenetrated. The horizontal dot/dash line designated 68 indicates an empirically determined threshold. When the processed output of the photo-position detector crosses below this threshold the penetration control signal goes to $+1$ as shown at locations A and C. When the output crosses above the threshold the penetration control signal crosses from $+1$ to $-1$ as shown at location B.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An apparatus for real-time determination of weld quality, comprising:
   means for generating and directing light incident to at least one point on a molten, specularly reflecting weld pool surface, said weld pool surface reflecting a portion of said incident light, said portion of said light being reflected having a specular component thereof;
   light beam position detecting means for measuring the direction of said specular component; and
   electronic means for analyzing said measurement for determining changes in angles of said weld pool surface for real time indications of the state of penetration of the weld pool.

2. The apparatus of claim 1 wherein said means for measuring includes a photo-position detector.

3. The apparatus of claim 2 further including means for collecting light into a coherent fiber bundle and delivering light to said photo-position detector.

4. The apparatus of claim 1 wherein the incident light is collimated.

5. The apparatus of claim 1 wherein the incident light is focused.

6. The apparatus of claim 1 wherein said means for generating the incident light is a monochromatic light source.

7. The apparatus of claim 6 wherein said monochromatic light source is a laser.

8. The apparatus of claim 6 further including an optical band pass filter for receiving light from the weld pool, said optical band pass filter transmitting the light from the monochromatic light source and rejecting light of the other wavelengths.

9. The apparatus of claim 1 wherein said means for directing the incident light is an optical fiber.

10. The apparatus of claim 1 further including intensity modulating means for intensity modulating the generated light at a known modulation frequency so that it can be distinguished from other light coming from the vicinity of the weld.

11. The apparatus of claim 1 wherein said electronic means includes means for detecting the sagging of the weld pool due to weld pool penetration.

12. The apparatus of claim 1 wherein said electronic means includes means for making averaged measurements over a period of time to distinguish sagging of the weld pool from deformation of the weld pool due to weld pulsing or the introduction of any welding wire into the weld pool.

13. The apparatus of claim 1 wherein said electronic means includes means for determining the amplitude of the deformations of the weld pool surface caused by periodic deformation of the weld pool surface due to a periodic driving means.

14. The apparatus of claim 13 wherein said driving means consists of a pulsing welding arc.

15. The apparatus of claim 13 wherein said driving means is a pulsed laser.

16. An apparatus for determining the state of penetration of a molten specular reflecting weld pool, comprising:
   a collimated light source for directing a collimated beam of light to a point on the weld pool surface, said weld pool surface reflecting a portion of said incident light, said portion of said light being reflected having a specular component thereof;
   a photo-position detector for monitoring the angular position of said specular component; and
   means for analyzing the output of the photo-position detector to determine the angular deflection of the weld pool surface at the point of reflection and thereby indicating the state of penetration.

17. An apparatus for determining the state of penetration of a molten, specularly reflecting weld pool, comprising:
- a collimated light source for directing a collimated beam of light to a point on the weld pool surface, said weld pool surface reflecting a portion of said incident light, said portion of said light being reflected having a specular component thereof;
- a photo-position detector for monitoring the angular position of said specular component; and
- means for determining the amplitude of weld pulse synchronized oscillations of the weld pool surface caused by pulsing of the welding arc.

18. A method for determining the state of penetration of a molten, specularly reflecting weld pool comprising:
- generating and directing light incident to at least one point on the weld pool surface, said weld pool surface reflecting a portion of said incident light, said portion of said light being reflected having a specular component thereof;
- measuring the direction of the incident light after it is specularly reflected from the weld pool surface; and
- analyzing said measurement for determining changes in angles of said weld pool for real time indications of the state of penetration of the weld pool.

19. The method of claim 18 wherein the direction of said specular component is measured by means of a light beam position detection means.

20. The method of claim 18 wherein the incident light generated is collimated.

21. The method of claim 18 wherein the incident light generated is focused.

22. The method of claim 18 wherein the incident light generated is monochromatic.

23. The method of claim 22 wherein the monochromatic light is generated by a laser.

24. The method of claim 23 including the step of positioning an optical band pass filter for receiving light from the weld pool, said optical band pass filter transmitting the light from the monochromatic light source and rejecting light of the other wavelengths.

25. The method of claim 18 wherein the incident light is directed by an optical fiber.

26. The method of claim 18 wherein the light is directed to the weld pool by collecting the light into a coherent fiber bundle.

27. The method of claim 18 including the step of intensity modulating the generated light at a known modulation frequency so that it can be distinguished from other light coming from the vicinity of the weld.

28. The method of claim 18 wherein measurements are averaged over a period of time to distinguish sagging of the weld pool from deformation of the weld pool due to weld pulsing or the introduction of any welding wire into the weld pool.

29. The method of claim 18 wherein the step of analyzing includes determining the amplitude of the deformation of the weld pool surface caused by periodic deformation of the weld pool surface due to a periodic driving means.

30. The method of claim 29 including the step of pulsing the welding arc for producing periodic deformation of the weld pool surface.

31. The method of claim 29 wherein said deformations to the weld pool are caused by a pulsed laser.

* * * * *